Figure 1:
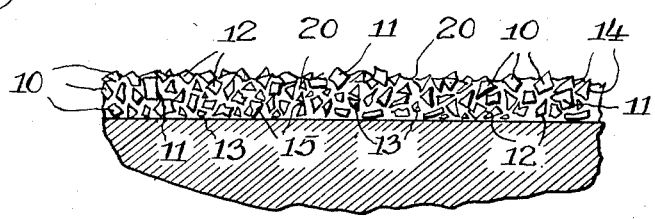

Dec. 23, 1958     J. F. WYNN     2,865,266

CENTERLINE PAINT

Filed Nov. 28, 1956

Inventor,
James F. Wynn,
By: Schneider, Dressler & Goldsmith,
Attys.

_United States Patent Office_

2,865,266
Patented Dec. 23, 1958

2,865,266

CENTERLINE PAINT

James F. Wynn, Marietta, Ohio, assignor to American-Marietta Company, a corporation of Illinois Application November 28, 1956, Serial No. 624,841

16 Claims. (Cl. 94—1.5)

The present invention relates to highway marking paints adapted to be sprayed, rolled or brushed on highway surfaces subjected to vehicular traffic to provide reflex light-reflective traffic markers, e. g., centerlines, having high night-time visibility to motorists. The highway marking paints of the invention are particularly characterized by enhanced durability under normal conditions of abrasive vehicular wear and are further characterized in that they can be produced at lower cost, loaded with reflex reflecting elements to a greater extent and with improved suspension characteristics and provide greater resistance to skid than conventional reflex reflective highway marking paints.

To the present time, the production of commercially suitable reflex reflective traffic markers has always been considered to require as an essential feature thereof, the use of spheres or beads to provide the reflex reflective action. Customarily, a paint composition was applied to the highway and glass beads applied to the previously laid and partially dried paint. The reflective traffic markers so formed provided adequate initial reflex reflective qualities. However, the reflex reflective quality was short lived and not durable. Also, the two-stage application procedure was slow and laborious and added to the cost of producing the traffic marker.

In the United States patent to Heltzer, No. 2,574,971, dated November 13, 1951, "Highway Marking Paint Containing Glass Beads," the glass spheres or beads were incorporated in the paint and the paint and the glass spheres applied together in a single stage. The paint film above the beads of this composition is worn away to expose the tops of the beads and in this manner a reflex reflective surface is developed through wear. The durability of the reflex reflective action, although somewhat improved, does not provide the high standards of night-time visibility for adequately long periods of time.

When only a small proportion of the top of a given bead is exposed, the reflex reflective action is poor. When a larger proportion of the bead is exposed, the bead becomes easily dislodged and the surrounding paint is subjected to heavy wear. Thus, the reflex reflective action is limited by these two factors. When the beads become sufficiently exposed to participate effectively in the reflex reflective action, they tend to become easily dislodged. The effectiveness and durability of the traffic marker is thus substantially impaired.

When the marking paint is applied to the highway itself, the dislodged beads do more than reduce the reflective quality and durability of the marker, for these dislodged beads act as ball bearing surfaces to increase the tendency of dangerous skids by vehicles, especially under wet traffic conditions.

The present invention is based on the discovery that, contrary to the general belief in the art, substantial reflex reflective qualities can be produced using glass fragments of non-spherical surface configuration constituted by a multiplicity of angularly related planar surfaces. It has been found that the glass fragments, preferably graded to possess a wide range of particle size, form effective reflex reflective elements when incorporated in an otherwise conventional reflective traffic paint in amounts of from about 3 to 8 pounds per gallon of glass-free paint. Further, the non-spherical planar and angular glass fragments of the invention are keyed to the layer of paint by virtue of their dimensional irregularity and planar surfaces and are not dislodged to any substantial extent by vehicular wear. This resistance to dislodgement is maintained despite the fact that a large portion of the upper surface of the fragment is exposed to permit effective reflex reflective action. In this manner, the durability of the paint layer and the reflex reflective action is greatly improved and acceptable standards of night visibility are maintained for greatly extended periods of time. Since the glass fragments are not easily dislodged, and because any particles which are dislodged are poorly adapted, because of their non-spherical configuration, to act as ball bearings, the danger of skids is also reduced. Since safety is the primary purpose of the highway marker, the fact that dislodged spheres or beads can contribute to dangerous skids substantially reduces the usefulness of the prior art highway marking paint as compared with the enhanced usefulness for this factor in the marking paint of the invention.

Figure 2:
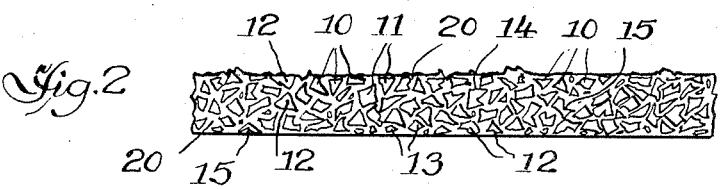
Figure 3:
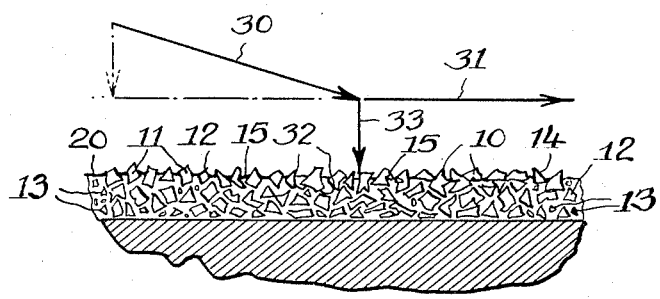

The invention will now be described in greater detail with reference to the accompanying drawings in which:

Figure 1 is a diagrammatic sectional view taken through a reflex reflective highway marking paint constructed in accordance with the invention, said paint having been freshly painted on a highway;

Fig. 2 is a fragmentary top plan view of the reflex reflective highway marking paint after the passage of vehicular traffic has abraded the upper surface of the paint to expose the upper portion of many of the reflex reflective elements incorporated therein; and Fig. 3 is a diagrammatic sectional view on an enlarged scale taken through the paint layer of Fig. 2 and illustrating the keying action which enables a more durable effective service life to be achieved.

Referring more particularly to the drawing, the glass fragments in Figure 1 are generically designated by the numeral 10 and, in accordance with preferred practice of the invention, a plurality of differently-sized fragments are present. Thus, the numeral 11 designates some of the larger-sized fragments, the numeral 12 designates some of the intermediate size fragments and 13 designates some of the smallest-sized fragments. The fragments 11, 12 and 13 are non-spherical, as is apparent from the drawing, and in the embodiment shown the surface configuration of the greater part of the fragments is constituted by a plurality of substantially planar faces 14. Some of the fragments also include non-planar faces 15. The various faces intersect in irregular manner and are angularly inter-related.

While it has generally been assumed that such non-spherical fragments would cause widespread dispersion of incident light, it has surprisingly been found that an effective and satisfactory reflex reflective action is achieved. The beam of a motorist's headlights is reflected back toward him from the reflective coating in a manner fully satisfying rigid highway standards of brilliance. Moreover, adequate brilliance is achieved at a range of angularities to permit a centerline to reveal a curve or sweep in the road ahead.

Fig. 2 clearly shows the manner in which the paint layer 20 is worn away to expose a large portion of the upper surface of the glass fragments 10. As will be evident, a considerable portion of the fragments 10 are exposed and vehicular traffic cannot further wear away the paint layer 20 until the fragments 10 are dislodged.

Fig. 3 diagrammatically illustrates the keying which locks the adjacent, overlapping fragments 10 in the paint layer 20 and prevents dislodgment thereof. More specifically, arrow 30 represents a thrust transmitted to the fragment 10 by an automobile tire. As can be seen, the lateral component 31 of the thrust 30 does not dislodge the fragment which is keyed to the paint as indicated at 32. Moreover, since the lateral component 31 is resisted, the downward component 33 tends to force the fragment 10 more firmly into the paint. Thus, dislodgment of the fragments 10 is substantially precluded.

*Example 1*

This example illustrates the production of glass fragments which are usable in accordance with the invention. These fragments should be made from a glass composition having a high index of refraction, preferably approximately 1.5 or higher. The glass should be transparent, although the degree of transparency may vary within rather wide limits. Preferably, the glass is clear and colorless, and free from milkiness, dark particles and air. Since in use the fragments are exposed to the elements, the glass used should be resistant to the action of water and should be capable of withstanding refluxing with distilled water in a Soxhlet extractor for 90 hours without noticeable surface dulling and not more than 2.5% loss in weight. The glass fragments also exhibit no tendency toward decomposition, including surface etching, when exposed to the atmosphere, moisture, dilute acids and alkalies and paint constitutents. Preferred glass compositions are as follows:

A. Soda lime glass—66% $SiO_2$; 16% $Na_2O$; 9% CaO; 9% mixture of metallic oxides consisting of barium, aluminum, iron, magnesium and potassium.
B. Crown optical glass—74.6% $SiO_2$; 9% $Na_2O$; 11% $K_2O$; 5% CaO.

The above compositions are crushed to produce fragments suitable for use in accordance with the invention. Thus, glass flake ½ mil in thickness is crushed so that all particles will have at least two reflective surfaces. Fragments are graded to the correct size by separating with vibrating screens of the desired mesh.

It has been found that fragments retained by a 270 mesh sieve possess considerable reflex reflective properties and particles which pass through a 270 mesh sieve can be re-melted and re-crushed. It is preferred to incorporate a range of differently-sized glass particles in a highway marking paint in accordance with the invention. A particularly preferred mixture is as follows:

| Sieve Size | Percent of mixture Passing Through |
| --- | --- |
| U. S. Standard No. 60 sieve | 100 |
| U. S. Standard No. 80 sieve | 80 |
| U. S. Standard No. 140 sieve | 15–30 |
| U. S. Standard No. 230 sieve | 0–10 |
| U. S. Standard No. 270 sieve | 0 |

The mixture above set forth is pictured in a highway marking paint in the drawings where it is incorporated in a layer of paint having a thickness of approximately 1.5 mils. A paint including this mixture is adapted to be sprayed with conventional spray equipment.

It is desired to point out that the invention is not limited to the specific glass compositions A & B of Example 1. Thus, another and a preferred illustrative composition is as follows:

C. Silicate glass—$SiO_2$ 70.6%; $Na_2O$ 17.0%; $MgO$ 0.1%; CaO 10.6%; $Al_2O_3$ 0.8%.

This glass in flakes approximately ½ mil in thickness is crushed to the desired particle size by hammer-milling. The desired particles are then separated by U. S. Standard sieves 60–270 mesh.

It is to be noted that larger fragments may be used (e. g., fragments which will not pass through a No. 60 sieve). However, these larger fragments are not adapted to a paint intended to be sprayed using conventional spray equipment and such paints can be applied in other ways, e. g., by brushing or by the use of spreaders. The larger fragments are useful and exhibit pronounced reflex reflective properties. Particles smaller than that retained by a #270 sieve are preferably excluded from the paint because these particles thicken the paint and provide little reflective action.

*Example 2*

A typical varnish base coating is as follows:

Varnish base:
| | |
| --- | --- |
| Phenolic modified pentaerythritol ester of rosin _____lbs__ | 119 |
| Hydrocarbon resin (Piccopale 100) _____lbs__ | 119 |
| Chinawood oil _____gal__ | 11.89 |
| Bodied linseed oil _____gal__ | 11.89 |
| VM & P naphtha _____gal__ | 57.80 |

In the above varnish base, the phenolic modified pentaerythritol ester of rosin is desirably the product "Pentalyn" 802A and having the following specifications:

| | |
| --- | --- |
| Softening point | 165°–170° C. |
| Color | K– |
| Acid number | 15–22. |
| Viscosity at 25° C.: | |
| (a) Linseed oil dispersion | 400+20 poises (minimum). |
| Viscosity 40% resin/60% oil | 600+20 poises (maximum). |
| (b) 50% solids | C (minimum). |
| Toluol (G. H.) | G (maximum). |

The hydrocarbon resin in the above varnish base is desirably of polymerized unsaturated petroleum monomers consisting essentially of diene and reactive olefins and having an average molecular weight of 90. These unsaturated monomers are polymerized to form a hard solid having an average molecular weight of 1100. Such a hydrocarbon resin may be "Piccopale" 100 having the following specification:

| | |
| --- | --- |
| Softening point | 100° C. |
| Specific Gravity at 25° C | .970–.975. |
| Color | 13 Gardner Holdt scale. |
| Acid number | Less than 1. |
| Saponification number | Less than 2. |
| Iodine value (WIJS) | 120. |
| Bromine number | 7.3. |

The varnish base above specified is prepared by heating the admixed "Pentalyn" 802A, "Piccopale" 100, Chinawood oil and 8 gallons of linseed oil in a kettle at 560° F. for 45 minutes. The heated mixture is then chilled by the addition of 3.89 gallons of linseed oil and allowed to cool to 350° F. whereupon the naphtha is added to the mixture. This varnish is employed in a paint composition as follows:

| | Lbs. |
| --- | --- |
| Varnish | 368.5 |
| Titanium dioxide pigment | 247.0 |
| Magnesium silicate | 126.0 |
| Graded crushed glass | 400.0 |
| Toluene | 91.0 |
| VM & P naphtha | 25.0 |
| 6% cobalt drier | .5 |
| 24% lead drier | 1.5 |

This paint is compounded by mixing the titanium dioxide and the magnesium silicate with 144.6 lbs. of varnish and the mixture is ground on a paint mill. The driers are then added and the remainder of the varnish and the crushed and graded glass fragments mixed thoroughly into the mixture. The toluene and naphtha thinners are then added. This paint had a viscosity of 75 Krebs units and a total solids content of 77%. The weight proportions of this paint are as follows:

| | Percent |
|---|---|
| Pigment | 29.62 |
| Vehicle solids | 15.8 |
| Crushed glass | 31.78 |
| Thinner & Drier | 22.8 |

The crushed glass used was the crushed glass of Example 1.

The finished paint can be applied with spray, brush or roller. Small amounts of naphtha may be used to compensate for individual application technique. If long storage is contemplated, small amounts of anti-settling agents, such as calcium linoleate, may be used for suspension.

It has been found that the crushed glass fragments, perhaps due to their geometrical angularity, are more satisfactorily maintained in satisfactory suspension than spherical beads. This is particularly true for the heavier particles, e. g., those retained by a 60 mesh screen, and this is of particular value in paints adapted for brush, roller or spreader application as contrasted with spray application.

Example 3

The following illustrates a paint composition employing as the vehicle a phthalic alkyd containing 30% phthalic anhydride having a soya modification of 55%, the alkyd being prepared using glycerin as the polyhydric alcohol and having the following characteristics in a 60% petroleum spirits solution:

| | |
|---|---|
| Solids | 60 percent. |
| Viscosity | Z1–Z3 Gardner Holdt. |
| Color (Hellige) | 1–3. |
| Acid number | 4–6. |
| Pounds per gallon | 7.8. |
| Phthalic anhydride | 30% (on resin solids). |
| Oil acid content | 50% (on resin solids). |
| Type of Oil | Soya. |

An alkyd of the above composition and having the characteristics stated is available in the trade under the trademark "Glyptal" 2475.

Paint composition: Lbs.
| | |
|---|---|
| Titanium dioxide | 225 |
| Phthalic alkyd (50% solids) | 400 |
| Calcium carbonate | 125 |
| Crushed glass | 400 |
| VM & P naphtha | 116 |
| Cobalt drier | .5 |
| Lead drier | 1.5 |

This paint was prepared by adding the titanium dioxide and calcium carbonate to 300 lbs. of the phthalic alkyd vehicle. This mixture was ground on a paint mill and the remainder of the vehicle added. The crushed glass (as specified in Example 1) was then stirred in thoroughly and the naphtha and driers added.

Example 3 is modified by using as the vehicle for the paint a 30% phthalic pentaerythritol alkyd modified with 54% of an oil consisting of equal parts by volume of linseed oil and soya oil having the following characteristics:

| | |
|---|---|
| Solids | 50 percent. |
| Solvent | { 50% VM & P naphtha. 50% Mineral spirits. |
| Acid number | 10.2. |
| Color | 7 (Gardner Holdt). |
| Pounds per gallon | 7.50. |
| Viscosity | V—W (Gardner Holdt). |

Example 4

The reflectorized paint may also be of the emulsion type as is illustrated by the following:

Pigment grind: Lbs.
| | |
|---|---|
| Water | 20.0 |
| Tetrasodium pyrophosphate decahydrate, 10% aqueous solution | 10.0 |
| "Emulphor" EL–719 dispersing and wetting agent | 2.0 |
| "Polyglycol P–1200 polypropylene glycol | 2.0 |
| "Carbitol" — diethylene glycol monoethyl ether | 25.0 |
| Dibutyl phthalate | 18.0 |
| ASP–400 clay | 75.0 |
| Titanium dioxide | 100.0 |
| Water | 20.0 |

Reduction:
| | |
|---|---|
| Water | 130.0 |
| "Methocel" 4000 methyl cellulose, 2.0% aqueous solution | 260.0 |
| "Elvacet" 81–900 polyvinyl acetate emulsion | 320.0 |
| Crushed glass (as specified in Example 1) | 300.0 |

"Elvacet" 81–900" polyvinyl acetate emulsion is a dispersion of polyvinyl acetate resin and water. The polyvinyl acetate resin is a thermoplastic, water-insoluble, colorless, odorless material having density at 20 degrees C. of approximately 1.2 and a refractive index of approximately 1.467. Specifications are:

| | |
|---|---|
| Solids | 55 percent. |
| Pounds per gallon | 9.2. |
| Viscosity at 25 degrees C | 800–1000 centipoises. |
| pH | 4–6. |

"Emulphor EL–719" is a polyoxyethylated vegetable oil which is used to promote wetting and stabilize the emulsion.

The "Polyglycol P 1200" is a polypropylene glycol with an approximate molecular weight of 1200. It is formed by the addition of propylene oxide to proplyene glycol. P 1200 acts as an anti-foaming agent for the emulsion.

Example 5

Resin solution types, either synthetic or natural, can be used, giving a quick drying paint resistant to wear. Typical example:

| | Lbs. |
|---|---|
| Titanium dioxide | 200.0 |
| Resin solution (50% manila resin-alcohol) | 400.0 |
| Magnesium silicate | 125.0 |
| Glass—crushed (as specified in Example 1) | 400.0 |
| Ethyl alcohol | 116.0 |

When synthetic resins are used, the thinner is simply varied to give optimum results. These reflectorized center line paints dry quickly by evaporation although in general they are not as tough as resinous paints.

Example 6

The following is a specific illustration of a graded mixture of crushed glass fragments containing fragments which are retained by a #60 mesh screen. These larger particles prevent sprayability in ordinary spray equipment because they tend to clog conventional spray equipment, but they may be used advantageously in producing paints for roller application. In such paints, up to about 50% by weight of particles which pass through a #40 mesh screen but are retained by a #60 mesh screen may be used. Particles retained by a #40 mesh screen but not by a #20 mesh screen may also be used in an amount not exceeding about 20% by weight. The use of still larger particles is not recommended, although up to 5% by weight of slightly larger particles can be tolerated.

These larger particles, when incorporated in a highway marker paint formulation, provide enhanced brilliance of night visibility and are of great value in speeding the initiation of the reflex reflective action upon vehicular abrasion of the traffic marker.

Preferred graded mixtures for roller application contain from 5–25% of particles which pass through a #40 mesh screen but which are retained by a #60 mesh screen and 10–30% of particles which pass through a #60 mesh screen and not a #80 mesh screen. Thus a particularly preferred mixture including a proportion of heavier glass particles, e. g., those retained by a #60 mesh screen, is as follows:

| Sieve Size | Percent of Mixture Passing Through |
| --- | --- |
| U. S. Standard No. 40 sieve | 100 |
| U. S. Standard No. 60 sieve | 90 |
| U. S. Standard No. 80 sieve | 75 |
| U. S. Standard No. 140 sieve | 15–25 |
| U. S. Standard No. 230 sieve | 0–10 |
| U. S. Standard No. 270 sieve | 0 |

The glass used in the above set forth mixture may be any of the glass compositions A, B & C which are more fully set forth in Example 1. This mixture may be incorporated in any of the reflective paint compositions set forth in Examples 2, 3, 4 and 5 to provide an effective highway marking paint having great durability and enhanced brilliance of night visibility in comparison with the use of the mixture of differently-sized glass particles set forth in Example 1.

It is desired to emphasize that the presence of a substantial proportion of glass fragments or particles which are retained by a #60 mesh screen causes the highway marking paint containing these glass fragments to clog conventional spray equipment. Hence, and as a practical matter, these latter highway marking paints, including large-sized incorporated glass fragments, are not amenable to spray application. However, these paints may be applied efficiently to highways in many manners other than spraying, as, for example, roller coating, in which instance the presence of the larger size particles or fragments does not prevent effective application of the paint incorporating the glass fragments.

Under abrasion, due to wear by vehicular traffic, the surface of the above exemplary paints wears away to expose the glass particles for their reflex reflective function.

Figs. 1 and 2 pictorially distinguish from beads by showing the flat angular surfaces and irregular non-spherical varying sizes of the glass fragments employed as compared with the glass beads used heretofore.

Fig. 3 as a diagrammatic cross-section of Fig. 2 serves to picture the mechanical keying action of the solid binder of the paint film for the irregular planar light-reflecting surfaces of the adjacent, overlapping glass fragments incorporated therein.

The explanation for this mechanical keying action is that the irregular exterior surfaces of the glass fragments embedded in the solid binder are in mechanical interlocking engagement with complementary surfaces of binder at the glass interface to provide mechanical interlocking in at least one and in fact several keying surfaces. This mechanical keying between solid binder and adjacent, overlapping glass particle prevents dislodgment even though the glass fragment may be loosened.

In contrast, a substantially spherical bead or a sphere-like glass object inherently precludes this kind of mechanical keying due to its curved form. A loosening force coupled with a force to dislodge the rounded glass particle from the resin binder causes the rounded object to roll and eliminates the reflective element from the resin matrix. The same forces acting in the same way at the irregular planar surfaces of the glass fragments of the invention fail to remove the fragments even though they may be loosened since they cannot roll and are mechanically retained by binder ledges in interlocking engagement with undercut glass portions.

By virtue of the absence of dislodgment, center line paint striping on highways with the paints of the invention provide a longer service life during which the necessary reflex reflectivity is present.

I claim:

1. A reflective highway marking paint comprising a paint vehicle containing a reflective pigment dispersed therein and from about 3 to about 8 pounds per gallon of glass-free paint of transparent glass fragments having a refractive index of at least approximately 1.5 incorporated in said paint, said glass fragments being sufficiently large to be retained by a U. S. Standard Number 270 mesh screen and being constituted by a plurality of angularly intersecting substantially planar, light reflecting faces.

2. A reflective highway marking paint comprising a drying-oil-base varnish vehicle containing a reflective pigment dispersed therein and from about 3 to about 8 pounds per gallon of glass-free paint of transparent glass fragments having a refractive index of at least approximately 1.5 incorporated in said paint, said glass fragments being sufficiently large to be retained by a U. S. Standard Number 270 mesh screen and being constituted by a plurality of angularly intersecting substantially planar, light reflecting faces.

3. A quick drying reflective highway marking paint comprising a drying-oil-base varnish vehicle containing a reflective pigment dispersed therein and from about 3 to about 8 pounds per gallon of glass-free paint of transparent glass fragments having a refractive index of at least approximately 1.5 incorporated in said paint, said glass fragments being sufficiently large to be retained by a U. S. Standard Number 270 mesh screen and passing through a U. S. Standard Number 60 mesh screen and being constituted by a plurality of angularly intersecting substantially planar, light reflecting faces.

4. A quick-drying reflective highway marking paint comprising a drying-oil-base varnish vehicle containing a reflective pigment dispersed therein and from about 3 to about 8 pounds per gallon of glass-free paint of transparent glass fragments incorporated in said paint, said glass fragments having a refractive index of at least 1.5, said fragments being clear, colorless and free from dark particles and air, and said glass fragments being sufficiently large to be retained by a U. S. Standard Number 270 mesh screen and passing through a U. S. Standard Number 60 mesh screen and being constituted by a plurality of angularly intersecting substantially planar, light reflecting faces.

5. A paint as claimed in claim 4 wherein said varnish vehicle is a vegetable oil modified alkyd resin of phthalic anhydride and glycerin which is dispersed in an organic solvent.

6. A paint as claimed in claim 5 wherein said reflective pigment includes titanium dioxide.

7. A paint, free from a thickening agent, as claimed in claim 5, wherein said reflective pigment consists of a combination of titanium dioxide and calcium carbonate.

8. A reflective highway marking paint comprising a vehicle containing a reflective pigment dispersed therein and from about 3 to about 8 pounds per gallon of glass-free paint of transparent glass fragments having a refractive index of at least approximately 1.5 incorporated in said paint, said glass fragments being sufficiently large to be retained by a U. S. Standard Number 270 mesh screen and being constituted by a plurality of angularly intersecting substantially planar, light reflecting faces, said glass fragments comprising up to about 50% by weight of fragments retained by a U. S. Standard Number 60 mesh screen and passing through a U. S. Standard Number 40 mesh screen.

9. A paint as claimed in claim 8 in which up to about 20% by weight of said glass fragments are restrained by a U. S. Standard Number 40 mesh screen and pass through a U. S. Standard Number 20 mesh screen.

10. A paint as claimed in claim 8 in which up to about 5% by weight of said fragments are slightly larger than the minimum size retained by a U. S. Standard Number 20 mesh screen.

11. A reflective highway marking paint comprising a vehicle containing a reflective pigment dispersed therein and from about 3 to about 8 pounds per gallon of glass-free paint of transparent glass fragments having a refractive index of at least approximately 1.5 incorporated in said paint, said glass fragments being sufficiently large to be retained by a U. S. Standard Number 270 mesh screen and being constituted by a plurality of angularly intersecting substantially planar, light reflecting faces, said glass fragments comprising from 5 to 25% by weight of fragments retained by a U. S. Standard Number 60 mesh screen and which pass through a U. S. Standard Number 40 mesh screen.

12. A paint as claimed in claim 11 in which about 10 to 30% by weight of said fragments are retained by a U. S. Standard Number 80 mesh screen and pass through a U. S. Standard Number 60 mesh screen.

13. A highway surface subject to vehicular traffic having a traffic marking stripe thereon adapted to redirect the beam of a motorist's headlight back toward him to provide high night-time visibility and possessing enhanced durability under normal conditions of abrasive wear, said marking stripe comprising a coating constituted by a highway marking paint comprising a vehicle containing dispersed therein a reflective pigment and transparent glass fragments having a refractive index of at least approximately 1.5, said glass fragments being sufficiently large to be retained by a U. S. Standard Number 270 mesh screen and passing through a U. S. Standard Number 60 mesh screen and being constituted by a plurality of angularly intersecting substantially planar, light reflecting surfaces.

14. A highway surface having a traffic marking stripe thereon as recited in claim 13 in which said marking stripe is abraded to expose a large portion of the upper surface of said glass fragments, said fragments resisting dislodgement by the keying action of said angularly intersecting substantially planar surfaces in said marking stripe.

15. A highway surface having a marking stripe adapted to redirect the beam of a motorist's headlights back toward him to provide high night-time visibility comprising a coating constituted by a highway marking paint comprising a vehicle containing dispersed therein a reflective pigment and transparent glass fragments having a refractive index of at least 1.5, said glass fragments being sufficiently large to be retained by a U. S. Standard Number 270 mesh screen and passing through a U. S. Standard Number 60 mesh screen and being constituted by a plurality of angularly intersecting substantially planar surfaces, said coating holding glass fragments with upper portions thereof in exposed position, said fragments being present in sufficient concentration to be in adjacent overlapping relationship to provide with the binder a keying action and thereby resist dislodgment.

16. A reflective highway marking paint comprising a paint vehicle containing a reflective pigment dispersed therein and transparent glass fragments having a refractive index of at least approximately 1.5 incorporated in said paint, said glass fragments being sufficiently large to be retained by a U. S. Standard Number 270 mesh screen and being constituted by a plurality of angularly intersecting substantially planar light reflecting faces, and being present therein in a concentration such that when applied to a highway as a marking paint the fragments are in an adjacent, overlapping relationship and provide with the binder of the paint vehicle a keying action which resists dislodgment.

References Cited in the file of this patent
UNITED STATES PATENTS

| | | |
|---|---|---|
| 406,949 | Overlack | July 16, 1889 |
| 1,568,955 | Buchholz | Jan. 12, 1926 |
| 2,040,733 | Fox | May 12, 1936 |
| 2,386,626 | Nadeau | Oct. 9, 1945 |
| 2,597,562 | Blodgett | May 20, 1952 |
| 2,632,752 | Anderson | Mar. 24, 1953 |

FOREIGN PATENTS

| | | |
|---|---|---|
| 266,363 | Great Britain | Feb. 17, 1927 |
| 590,862 | France | June 24, 1925 |

OTHER REFERENCES

Morey: "Properties of Glass," Monogram series #77, (2nd ed., 1945) p. 397.

Martin: "Lacquer and Synthetic Enamel Finishes" (1940), p. 406.